United States Patent
L'Ecuyer

(10) Patent No.: US 9,993,112 B2
(45) Date of Patent: Jun. 12, 2018

(54) GRILL WITH STOVE ATTACHMENT DEVICE

(71) Applicant: Gerald V L'Ecuyer, Anaheim, CA (US)

(72) Inventor: Gerald V L'Ecuyer, Anaheim, CA (US)

( * ) Notice: Subject to any disclaimer, the term of this patent is extended or adjusted under 35 U.S.C. 154(b) by 350 days.

(21) Appl. No.: 14/887,060

(22) Filed: Oct. 19, 2015

(65) Prior Publication Data

US 2017/0105575 A1   Apr. 20, 2017

(51) Int. Cl.
  *A47J 37/07* (2006.01)
  *F24C 3/14* (2006.01)
  *F24C 1/16* (2006.01)

(52) U.S. Cl.
  CPC ............ *A47J 37/0763* (2013.01); *F24C 1/16* (2013.01); *F24C 3/14* (2013.01)

(58) Field of Classification Search
  CPC ............ A47J 37/0763; F24C 1/16; F24C 3/14
  See application file for complete search history.

(56) References Cited

U.S. PATENT DOCUMENTS

| | | | |
|---|---|---|---|
| 6,609,512 B2* | 8/2003 | Poe, Jr. | A47J 37/074 126/25 A |
| 2010/0154770 A1* | 6/2010 | Zhou | F24C 3/14 126/42 |

OTHER PUBLICATIONS

Overland Bound: Tempo Tusk Skottle review: Youtube: Oct. 10, 2015 (retrieved Nov. 27, 2017) retreived from internet: <URL:https://www.youtube.com/watch?v=wF2KjyOmJYw>; see entire video.*

* cited by examiner

*Primary Examiner* — Alfred Basichas
(74) *Attorney, Agent, or Firm* — John R. Ross; John R. Ross, III

(57) ABSTRACT

A cooking device. A stove support bracket is rigidly attached to the underside of a grill. A plurality of legs is attached to the grill for support. A stove having cookware support extensions is attached to the grill and supported by the stove support bracket. A stove position adjustment mechanism is connected to the stove support bracket. The stove support mechanism is for moving the stove upwards so that the cookware support extensions are pressed tightly against the underside of the grill for optimum heat transfer. In a preferred embodiment, the grill is a skottle grill.

8 Claims, 5 Drawing Sheets

GRILL WITH STOVE ATTACHMENT DEVICE

The present invention relates to cooking devices, and in particular, to cooking devices utilizing attachable portable stoves.

BACKGROUND OF THE INVENTION

Disc Harrow

The disc harrow is a plowing and tilling tool used worldwide to open and break up the soil surface to help prepare the soil seedbed for planting. The disc harrow has applications in small and large commercial farms, homeowner landscaping, small nurseries, gardens, small hobby farms, wild game food plots, and medium-duty residential use. The disc harrow uses disc harrow blades. A typical disc harrow blade is concave, fabricated from carbon steel and has a diameter that can vary between approximately 12-36 inches.

The Skottle

The skottle originated in South Africa where farmers found a secondary use for old harrow discs by turning them into an outdoor cooking utensil that could be used while out in the fields. FIG. 2 shows prior art skottle 100 having agricultural harrow disc blade 99 with attached handles 103. The skottle caught on with the public in the 1940s and 50s and is now synonymous with grilling in South Africa. In prior art, the user grabs the handles and lays the skottle over hot coals for the purpose of cooking. Anything that can be cooked in a pan, skillet or on a grill can be cooked in a skottle. Bacon, eggs, sausage and hash browns is a great example for breakfast.

Propane Burner Stove

FIG. 1 shows a prior art single burner propane stove 13 with attached propane fuel canister 21. An exemplary prior art single burner propane stove 13 is available from the Coleman Company, Inc., model no. 5431A700 one-burner propane stove. Propane stove 13 includes control valve 22 for controlling the amount of propane permitted to flow from canister 21 to burner 23. Four cookware support extensions 24 are attached to stove 13 as shown. For stove 13, the user typically first turns valve 24 to allow a flow of propane gas to flow through burner 23. The user then places a small pot or frying pan on top of cookware support extensions 24 over the flame from burner 23 for cooking. The user can control the heat by turning valve 22. This is an effective design. However, if the pot or frying pan is too large, stove 13 may become too top heavy and flip over.

What is needed is a better cooking device that allows the use of a portable stove with a skottle grill.

SUMMARY OF THE INVENTION

The present invention provides a cooking device. A stove support bracket is rigidly attached to the underside of a grill. A plurality of legs is attached to the grill for support. A stove having cookware support extensions is attached to the grill and supported by the stove support bracket. A stove position adjustment mechanism is connected to the stove support bracket. The stove support mechanism is for moving the stove upwards so that the cookware support extensions are pressed tightly against the underside of the grill for optimum heat transfer. In a preferred embodiment, the grill is a skottle grill.

DETAILED DESCRIPTION OF THE PREFERRED EMBODIMENTS

Figure 3:
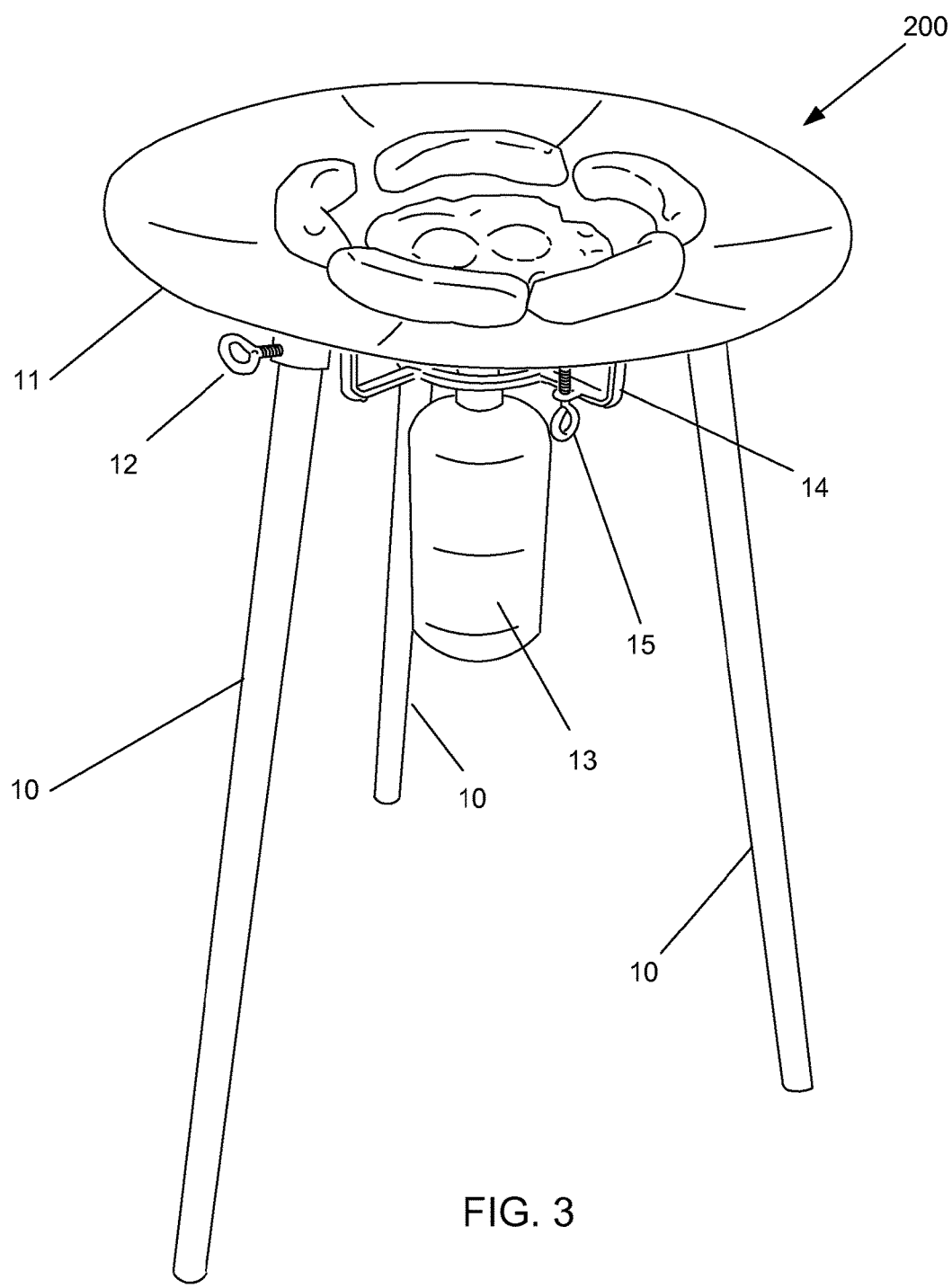
FIG. 3 shows a preferred embodiment of the present invention.

FIG. 3 shows a preferred embodiment of the skottle grill 200. Three legs 10 are removably attached to the underside of grill 11 and are secured tightly using hand-operated threaded attachment screws 12. Propane single burner stove 13 is supported by bracket 14 and is secured tightly against the underside of grill 11 by utilization of bracket 14 and threaded attachment stove screws 15. Food may then be placed into grill 11 as shown for cooking.

Skottle Grill

Figure 4:
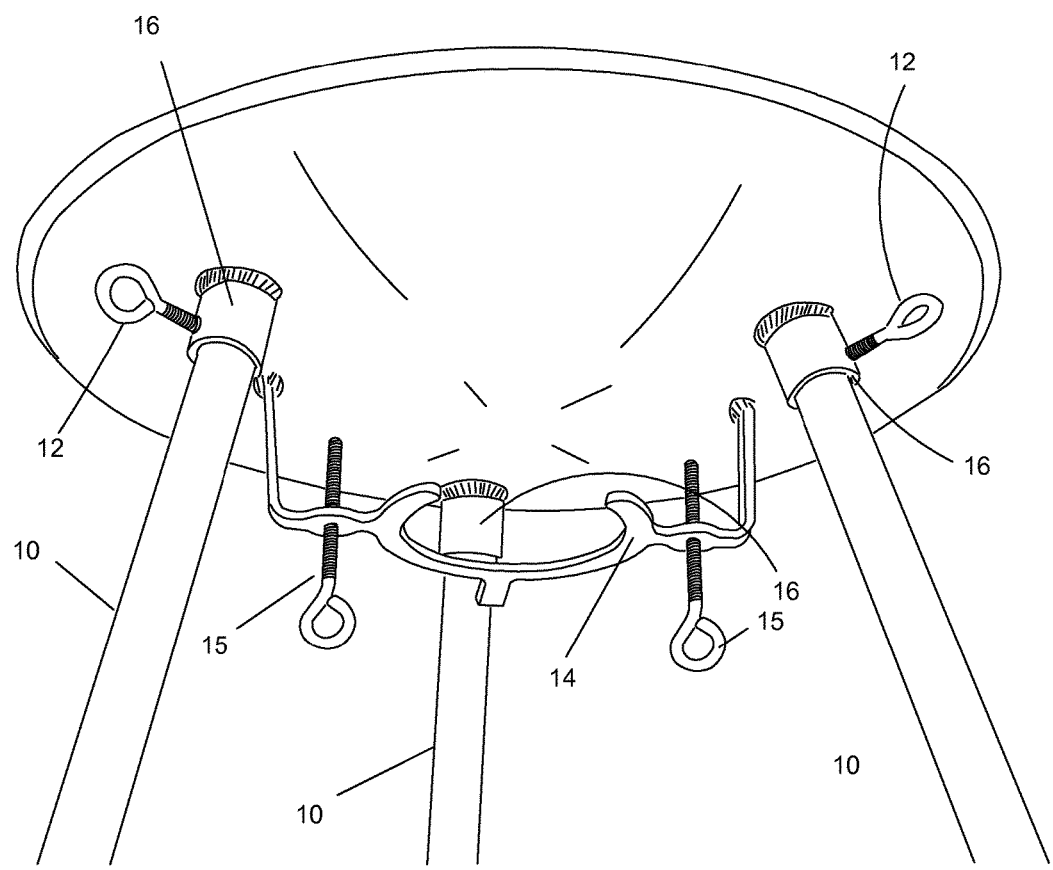
FIG. 4 shows the underside of a preferred skottle grill with welded support bracket.

FIG. 4 shows the underside of grill 11. Bracket 14 has been welded to the underside of grill 11. Leg support sleeves 16 have been welded to the underside of grill 11. Legs 10 are inserted into leg sleeves 16 and are secured in place with threaded attachment screws 12. Stove screws 15 are threaded through bracket 14 and may be loosened away from grill 11 or tightened towards grill 11.

Attaching the Burner to the Grill

Figure 1:
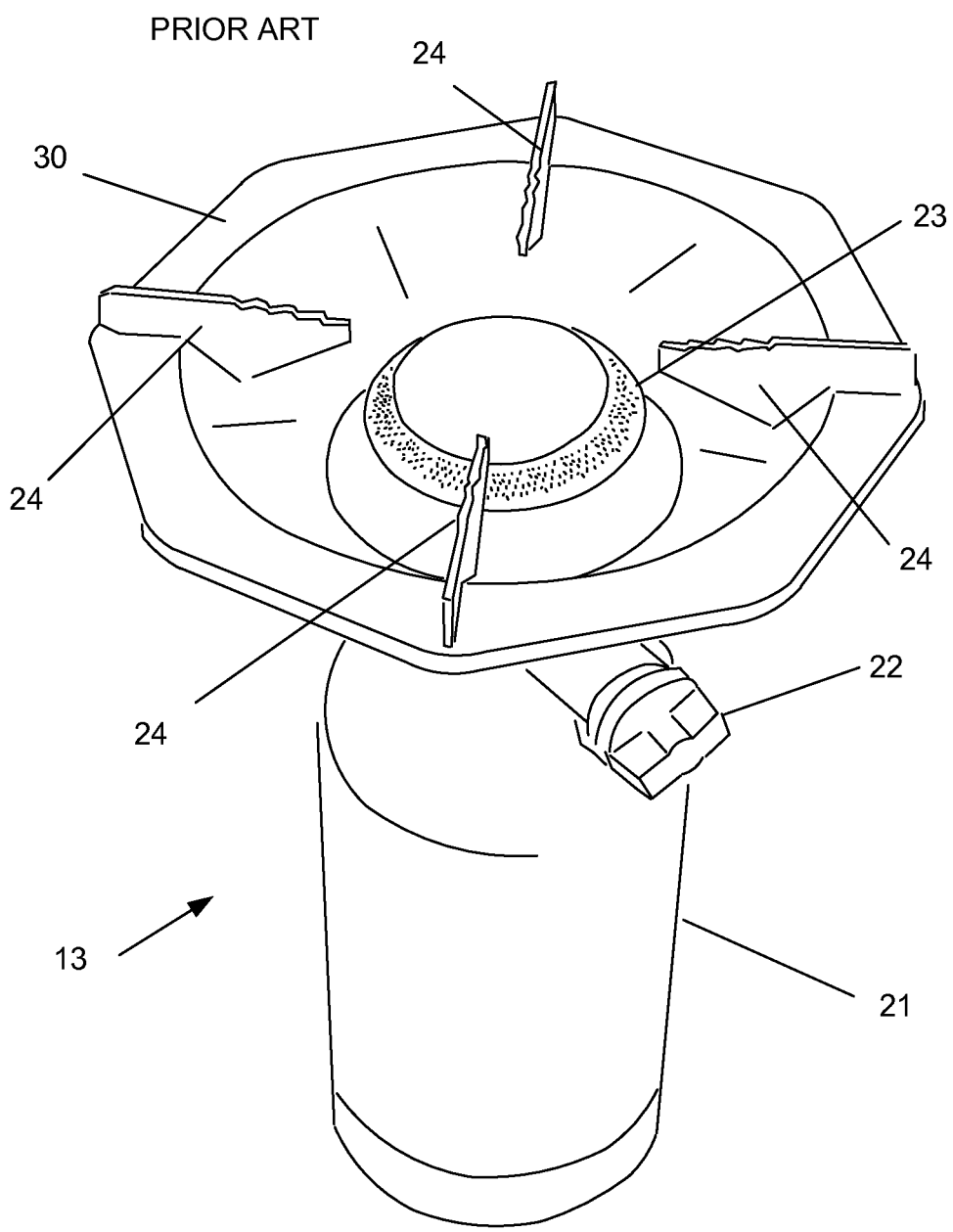
FIG. 1 shows a prior art portable propane stove with one burner.
Figure 2:
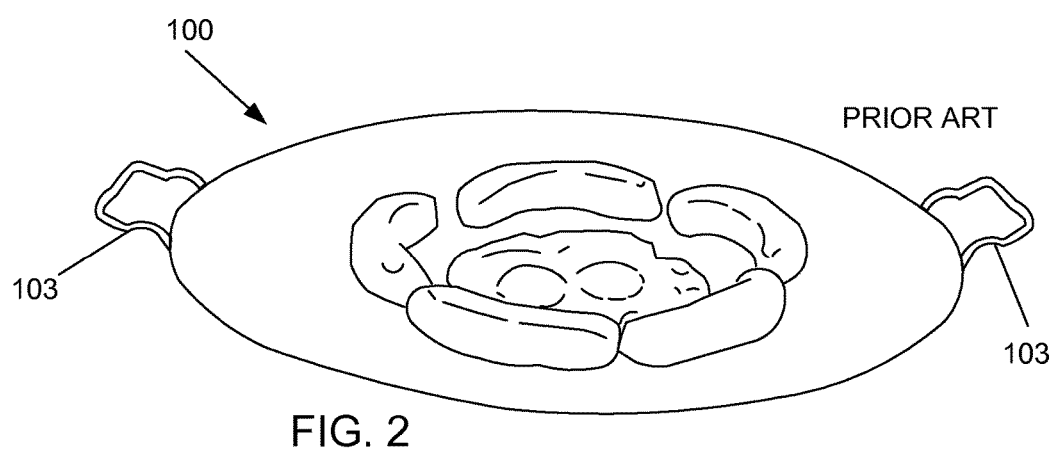
FIG. 2 shows a prior art skottle grill.
Figure 5:
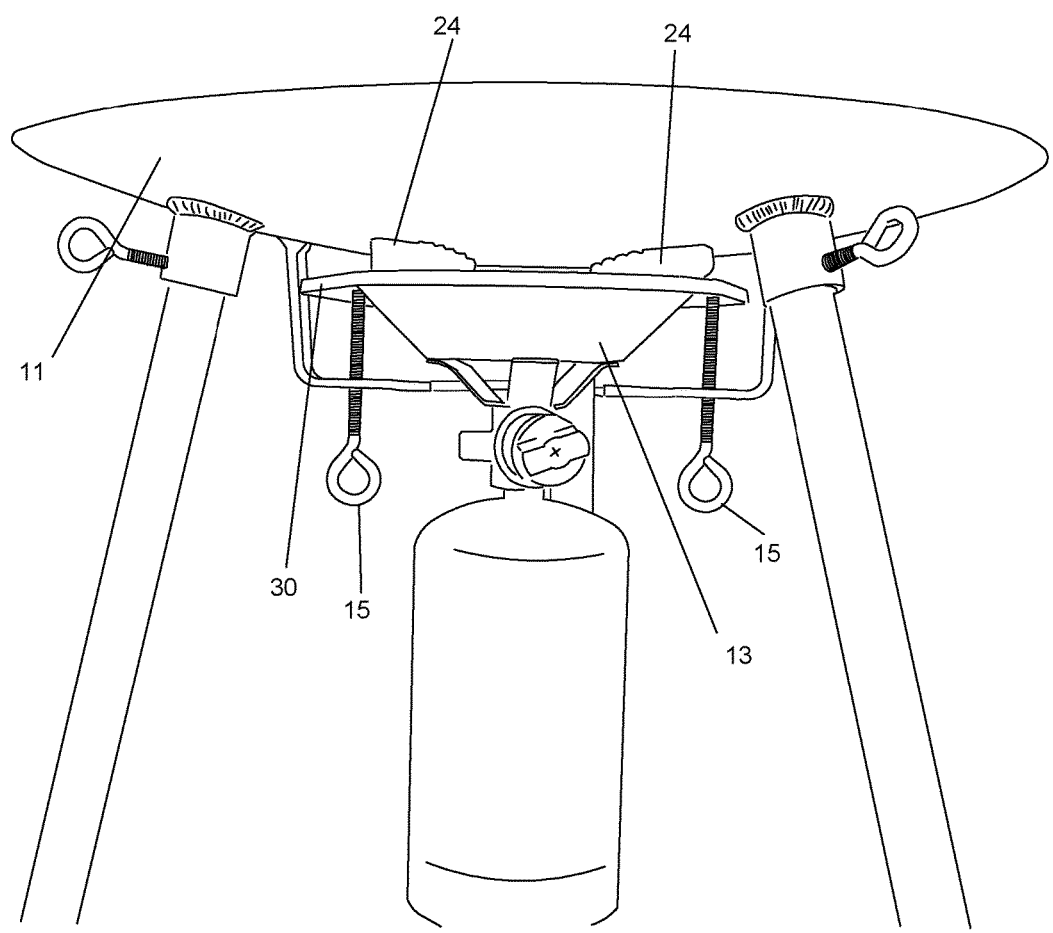
FIG. 5 shows a side view of a stove pressed tightly against the underside of a preferred skottle grill.

In FIG. 5 the user has inserted stove 13 into bracket 14 so that upper ridge 30 is inserted over screws 15 (see also FIG. 1). The user has then tightened screws 15 so that they move upwards towards grill 11. The closer burner 23 (FIG. 1) is to grill 11, the higher the temperature of the grill for cooking purposes. In FIG. 5 the user has tightened screws 15 upwards so that cookware support extensions 24 are pressed tightly against the underside of grill 11 for optimum heat transfer. The user is now ready to operate skottle grill 200 in a fashion depicted in FIG. 3. For example, in FIG. 3 stove 13 is pressed tightly against the underside of grill 11 for optimum heat transfer and the user is cooking sausages and eggs on skottle grill 200.

While the present invention has been described in terms of preferred embodiments, the reader should consider these described embodiments only as particular embodiments. Many other embodiments are possible. For example, even though the above preferred embodiments discussed the utilization of skottle grill 11 for the present invention, it should be understood that bracket 14 could be welded to a variety of grill types other that a skottle grill. For example, bracket 14 could be welled to the bottom of a large frying pan or a Japanese wok. Therefore, the reader should determine the scope of the present invention by the claims and their legal equivalents.

What is claimed is:

1. A cooking device, comprising:
A. a grill, comprising a grill underside,
B. a stove removably attached to said grill, said stove comprising a burner connected to said stove and cookware support extensions connected to said stove,
C. a plurality of leg support sleeves rigidly attached to said grill underside,
D. a plurality of legs attached to said plurality of leg support sleeves,
E. a stove support bracket rigidly attached to said grill underside, and
F. a stove position adjustment mechanism connected to said stove support bracket, said stove position adjustment mechanism for moving said stove upwards so that said cookware support extensions are pressed tightly against the underside of said so that flames from said burner contact the underside of said grill for optimum heat transfer.

2. The cooking device as in claim 1, wherein said grill is a skottle grill.

3. The cooking device as in claim 1 wherein said stove is a single burner propane stove.

4. The cooking device as in claim 1 wherein said plurality of legs is a plurality of detachable legs.

5. The cooking device as in claim 1 wherein said plurality of legs is three legs.

6. The cooking device as in claim 1 wherein said stove support bracket is welded to said grill underside.

7. The cooking device as in claim 1 wherein said stove position adjustment mechanism is two stove screws threaded through said stove support bracket, wherein said two screws press upward on an upper ridge of said stove so that said cookware support extensions are pressed tightly against the underside of said grill so that said cookware support extensions are rigidly held in place against the underside of said grill.

8. The cooking device as in claim 1, wherein said stove position adjustment mechanism moves said stove upwards so that said cookware support extensions are compressed tightly against the underside of said grill and are rigidly held in place against the underside of said grill for optimum heat transfer.

* * * * *